United States Patent [19]
Usuki et al.

[11] Patent Number: 5,743,826
[45] Date of Patent: Apr. 28, 1998

[54] SPEED CHANGE CONTROL APPARATUS FOR AN AUTOMATIC TRANSMISSION

[75] Inventors: Katsutoshi Usuki, Kyoto; Kenjiro Fujita, Kusatsu; Katsuhiro Hatta, Uji, all of Japan

[73] Assignee: Mitsubishi Jidosha Kogyo Kabushiki Kaisha, Tokyo, Japan

[21] Appl. No.: 588,334

[22] Filed: Jan. 18, 1996

[30] Foreign Application Priority Data

Jan. 18, 1995 [JP] Japan .................... 7-005994

[51] Int. Cl.$^6$ ................................ F16H 61/08
[52] U.S. Cl. .................. 477/98; 477/120; 477/143; 477/154
[58] Field of Search ................ 477/97, 98, 115, 477/116, 130, 143, 154, 156

[56] References Cited

U.S. PATENT DOCUMENTS

| | | | |
|---|---|---|---|
| 4,870,581 | 9/1989 | Ito et al. ................ | 477/154 X |
| 4,943,920 | 7/1990 | Hiramatsu et al. ....... | 477/154 X |
| 5,216,606 | 6/1993 | Lentz et al. ............ | 477/98 X |
| 5,282,401 | 2/1994 | Hebbale et al. ......... | 477/120 X |
| 5,335,567 | 8/1994 | Seidel et al. ........... | 477/154 |
| 5,580,332 | 12/1996 | Mitchell et al. ......... | 477/143 |

FOREIGN PATENT DOCUMENTS 5-187533  7/1993  Japan .

*Primary Examiner*—Khoi Q. Ta

[57] ABSTRACT

A speed change control apparatus for an automatic transmission includes a transmission control unit for controlling gear-changing. The control unit discriminates a fluid temperature/rotational speed zone based on the hydraulic fluid temperature and the engine speed at the start of gear-changing, and detects a time period from the end of dead-stroke elimination of an engagement-side hydraulic clutch to the start of actual gear-changing. In the case that a condition for executing learning correction is satisfied and if a time period from the end of the dead-stroke elimination to the start of the actual gear-changing is longer than an upper limit, the control unit increases a learning-correction time with which a dead-stroke-elimination time for the discriminated temperature/speed zone is calculated. The learning-correction time is decreased if such a time period is shorter than a lower limit. By carrying out the learning correction for various temperature/speed, occurrences of degraded shift response and shift shocks resulting from the presence of individual difference of the automatic transmission and an increase or decrease in the engine speed or fluid temperature can be prevented.

8 Claims, 16 Drawing Sheets

FIG.13

| | $Ne \leq N_1$ | $N_1 < Ne \leq N_2$ | $N_2 < Ne \leq N_3$ | $N_3 < Ne$ |
|---|---|---|---|---|
| $T_{ATF} \leq T_{A1}$ | $Tf_{11}$ (96 ms) | $Tf_{12}$ (80 ms) | $Tf_{13}$ (80 ms) | $Tf_{14}$ (64 ms) |
| $T_{A1} < T_{ATF} \leq T_{A2}$ | $Tf_{21}$ (112 ms) | $Tf_{22}$ (96 ms) | $Tf_{23}$ (96 ms) | $Tf_{24}$ (80 ms) |
| $T_{A2} < T_{ATF} \leq T_{A3}$ | $Tf_{31}$ (112 ms) | $Tf_{32}$ (96 ms) | $Tf_{33}$ (96 ms) | $Tf_{34}$ (80 ms) |
| $T_{A3} < T_{ATF} \leq T_{A4}$ | $Tf_{41}$ (112 ms) | $Tf_{42}$ (96 ms) | $Tf_{43}$ (96 ms) | $Tf_{44}$ (80 ms) |
| $T_{A4} < T_{ATF}$ | $Tf_{51}$ (128 ms) | $Tf_{52}$ (112 ms) | $Tf_{53}$ (112 ms) | $Tf_{54}$ (96 ms) |

FIG.14

| | $Ne \leqq N_1$ | $N_1 < Ne \leqq N_2$ | $N_2 < Ne \leqq N_3$ | $N_3 < Ne$ |
|---|---|---|---|---|
| $T_{ATF} \leqq T_{A1}$ | $Tfl_{11}$ | $Tfl_{12}$ | $Tfl_{13}$ | $Tfl_{14}$ |
| $T_{A1} < T_{ATF} \leqq T_{A2}$ | $Tfl_{21}$ | $Tfl_{22}$ | $Tfl_{23}$ | $Tfl_{24}$ |
| $T_{A2} < T_{ATF} \leqq T_{A3}$ | $Tfl_{31}$ | $Tfl_{32}$ | $Tfl_{33}$ | $Tfl_{34}$ |
| $T_{A3} < T_{ATF} \leqq T_{A4}$ | $Tfl_{41}$ | $Tfl_{42}$ | $Tfl_{43}$ | $Tfl_{44}$ |
| $T_{A4} < T_{ATF}$ | $Tfl_{51}$ | $Tfl_{52}$ | $Tfl_{53}$ | $Tfl_{54}$ |

FIG.15

| | $Ne \leq N_1$ | $N_1 < Ne \leq N_2$ | $N_2 < Ne \leq N_3$ | $N_3 < Ne$ |
|---|---|---|---|---|
| $T_{AFT} \leq T_{A1}$ | $D_{A11}$ (25%) | $D_{A12}$ (22%) | $D_{A13}$ (22%) | $D_{A14}$ (19%) |
| $T_{A1} < T_{ATF} \leq T_{A2}$ | $D_{A21}$ (28%) | $D_{A22}$ (25%) | $D_{A23}$ (25%) | $D_{A24}$ (22%) |
| $T_{A2} < T_{ATF} \leq T_{A3}$ | $D_{A31}$ (28%) | $D_{A32}$ (25%) | $D_{A33}$ (25%) | $D_{A34}$ (22%) |
| $T_{A3} < T_{ATF} \leq T_{A4}$ | $D_{A41}$ (28%) | $D_{A42}$ (25%) | $D_{A43}$ (25%) | $D_{A44}$ (22%) |
| $T_{A4} < T_{ATF}$ | $D_{A51}$ (31%) | $D_{A52}$ (28%) | $D_{A53}$ (28%) | $D_{A54}$ (25%) |

SPEED CHANGE CONTROL APPARATUS FOR AN AUTOMATIC TRANSMISSION

BACKGROUND OF THE INVENTION

1. Field of the Invention

The present invention relates to a speed change control apparatus for an automatic transmission, and more particularly, to a speed change control apparatus which prevents occurrences of poor shift response and shift shocks.

2. Description of the Related Art

A vehicular automatic transmission is generally equipped with a speed change mechanism which includes planetary gear sets comprised of power transmitting elements such as sun gears and planetary carriers and which includes hydraulic friction-engaging elements such as hydraulic wet-type multiple disc clutches and hydraulic band brakes. A line pressure generated by a hydraulic pump driven by the crankshaft of an internal combustion engine is used as a drive source for the hydraulic friction-engaging elements. The automatic transmission of this type controls the operating states of the friction-engaging elements relating to speed change (gear-changing) by controlling the oil pressure supply to and discharge from the friction-engaging elements, whereby the engine torque transmission path in the planetary gear sets is changed to establish a desired speed (gear ratio).

An electronically controlled automatic speed change apparatus uses electromagnetic oil-pressure control valves (hereinafter referred to as electromagnetic valves) to control the operating states of the hydraulic friction-engaging elements. Specifically, by controlling the on-off duty ratios of the electromagnetic valves, the oil pressure supply to and discharge from the hydraulic friction-engaging elements are controlled such that these elements are engaged or disengaged. Furthermore, by switching the friction-engaging elements to be engaged, that is, by disengaging one of the friction-engaging elements relating to gear-changing and by engaging the other friction-engaging element, the gear-changing is performed while reducing a shift shock at the time of the engagement and disengagement of the friction-engaging elements.

For example, when an upshifting is carried out from the second speed to the third speed, the frictional element for establishing the second speed (disengagement-side frictional element) is disengaged, and the frictional element for establishing the third speed (engagement-side frictional element) is engaged. By effecting the aforementioned switching operation for the frictional elements, the engine torque transmission path is changed, whereupon the upshifting operation is completed.

As described above, the hydraulic wet-type multiple disc clutch has been widely used as a frictional element. The multiple disc clutch includes driving plates, driven plates, a clutch piston, and a return spring for urging the piston toward the return position side of the piston. The driving plates and the driven plates are alternately disposed. If oil pressure is supplied to the clutch piston, the piston will move against the spring force of the return spring to bring adjacent plates into press contact with one another, whereby the clutch is engaged. Meanwhile, if the oil pressure supply to the piston is stopped and the piston is returned to its original position by the spring force of the return spring, the adjacent plates will be separated from one another and the engagement of the clutch will be released.

In the wet-type multiple disc clutch, the driving plates and the driven plates are disposed in hydraulic fluid or automatic transmission fluid (ATF). If these plates are close to one another, a dragging torque takes place between adjacent plates even when the engagement of the clutch is released. To prevent occurrence of such dragging torque, the clutch is designed to have a predetermined clearance between every adjacent two plates when the clutch is disengaged. Therefore, if the travel speed of the clutch piston is too low, the engagement of the clutch will take time to give poor shift response. Conversely, if the travel speed of the piston is too high, the clutch will be abruptly engaged to allow a great shift shock to take place.

Thus, a so-called "dead-stroke elimination," in which the oil supply quantity to the clutch piston is increased by fully opening the electromagnetic valve so that the piston may be moved at a comparatively high speed, is generally carried out until the clutch begins to engage, i.e., during the time the clutch piston is in the dead-stroke section. After completion of the dead-stroke elimination, the oil supply quantity to the piston is feedback-controlled so that the degree of engagement of the clutch may be gradually increased. By such oil supply quantity control, the shift response is improved and the degree of shift shock is reduced to a considerable extent.

However, the engine operating state varies greatly, and there are individual differences among automatic transmissions. For this reason, it is difficult to establish an appropriate dead-stroke-elimination time. If the dead-stroke-elimination time is not appropriate, the shift response becomes poor or a shift shock will take place.

SUMMARY OF THE INVENTION

The present invention has been originated based on findings of the present inventors that influences of the temperature of hydraulic fluid in an automatic transmission, the rotational speed of a hydraulic pump or an engine with the automatic transmission, and an individual difference of the automatic transmission to the dead-stroke-elimination time (control parameter value) have to be taken into consideration, in order to establish a proper dead-stroke-elimination time required for a piston of a hydraulic frictional element of the automatic transmission to move through its dead-stroke section to thereby eliminate the piston dead stroke (more generally, a proper value of the control parameter relating to control of drive of hydraulic control means for controlling oil pressure supply to the frictional element).

An object of the present invention is to provide a speed change control apparatus for an automatic transmission, which is capable of preventing occurrence of poor shift response or shift shocks resulting from the individual difference of the automatic transmission, an increased or decreased rotational speed of an internal combustion engine or a hydraulic pump, and an increased or decreased hydraulic fluid temperature of the automatic transmission.

According to the present invention, there is provided a speed change control apparatus for use in an automatic transmission interposed between an internal combustion engine and a driving wheel and having a frictional element which is engaged to establish a predetermined gearshift position when hydraulic fluid is supplied thereto, and a hydraulic pump for generating an oil pressure, this speed change control apparatus having oil-pressure control means for controlling the oil pressure of the hydraulic fluid supplied from the hydraulic pump to the frictional element.

The speed change control apparatus of the present invention comprises oil-temperature detecting means for detecting the temperature of the hydraulic fluid in the automatic transmission; speed detecting means for detecting the rotational speed of the internal combustion engine or the hydraulic pump; and learning correction means for selecting one of a plurality of divided learning areas that corresponds to the temperature of the hydraulic fluid detected by the oil-temperature detecting means and to the rotational speed detected by the speed detecting means, and for carrying out a learning correction of a value of a control parameter, relating to a control of drive of the oil-pressure control means, for the selected learning area.

According to the present invention, for the learning area selected in accordance with the temperature of the hydraulic fluid and the rotational speed of the internal combustion engine or hydraulic pump, the learning correction of the value of the control parameter, relating to the control of drive of the hydraulic control means for controlling the oil pressure supplied to the frictional element, is carried out. Accordingly, a proper control parameter value can be established irrespective of the individual difference of the automatic transmission, the hydraulic fluid temperature, and the rotational speed of the internal combustion engine or hydraulic pump. With this, occurrence of poor shift response or shift shocks can be prevented.

Hitherto, there are some cases where shift response gets poor or a shift shock takes place, because of individual differences among automatic transmissions, the increased or decreased hydraulic fluid temperature, and the increased or decreased rotational speed of an internal combustion engine or hydraulic pump. The reasons will be described with reference to FIGS. 16 and 17.

As apparent from FIG. 16 showing an engine speed versus line pressure characteristic of a hydraulic pump, the line pressure generated by the hydraulic pump driven by an internal combustion engine is lower than a specified value when the rotational speed of the engine is low, for example, during the idling operation of the engine. For this reason, when the internal combustion engine is operated in a low speed zone, the shift response sometimes gets poor because of insufficient supply of the oil pressure to the hydraulic frictional element. The degraded shift response caused by a reduced line pressure becomes conspicuous especially at the time of gear-changing effected in a condition that the throttle valve is in a fully closed state (for example, N-D or N-R shifting effected in response to a select lever operation from NEUTRAL to DRIVE or REVERSE, cost-down shifting (power-off downshifting), or power-off upshifting).

Even if automatic transmissions are of the same type, their hydraulic pump characteristics differ from one another because of the presence of individual differences among these automatic transmissions. Specifically, if a typical transmission among them has a hydraulic pump characteristic shown by the solid line in FIG. 16, other automatic transmissions may have hydraulic pump characteristics shown by the broken line or the one-dot chain line in FIG. 16. Therefore, if hydraulic control means of an automatic transmission whose hydraulic pump characteristic is different from the typical hydraulic pump characteristic is driven in the same manner as in the case of the automatic transmission having the typical pump characteristic, it can happen that the oil pressure, supplied from the hydraulic pump to the hydraulic frictional element through the oil-pressure control means, will become excessive, so that the timing of starting the engagement of the frictional element will be advanced to generate a shift shock, or the supplied oil pressure becomes insufficient to delay the timing of starting the engagement, resulting in degraded shift response.

When the hydraulic fluid temperature is low (for example, immediately after the cold start of the internal combustion engine), the viscosity of the hydraulic fluid becomes high. Meanwhile, when the hydraulic fluid temperature is high (for example, immediately after high-speed engine operation), the viscosity of the hydraulic fluid is low. Furthermore, as the fluid temperature rises, clearances between various sliding portions in the automatic transmission increase. Therefore, the quantity of hydraulic fluid leakage in the automatic transmission increases or decreases depending upon the hydraulic fluid temperature. Specifically, an automatic transmission having, after completion of the idling operation of the engine, the hydraulic pump characteristic shown by the solid line in FIG. 17 shows a different hydraulic pump characteristic shown by the one-dot chain line in FIG. 17 when the hydraulic fluid temperature is low (for example, immediately after the cold start of the engine). Also, this automatic transmission shows a hydraulic pump characteristic shown by the broken line in FIG. 17 when the hydraulic fluid temperature is high (for example, immediately after high-speed engine operation). In other words, the hydraulic pump characteristic of the automatic transmission varies depending upon the hydraulic fluid temperature. The variation in the hydraulic pump characteristic, caused by a variation in the hydraulic fluid temperature, is conspicuous in the low speed zone of the internal combustion engine. For this reason, if the oil-pressure control means is driven independent of the hydraulic fluid temperature, the oil pressure supplied to the frictional element will become excessive particularly in the low speed zone of the internal combustion engine, when the hydraulic fluid temperature is low, to generate a shift shock. On the other hand, when the hydraulic fluid temperature is high, the oil pressure supplied to the frictional element becomes insufficient to lower the shift response.

As described above, occurrences of shift shocks and degraded shift response, resulting from the individual difference of the automatic transmission, the increased or decreased temperature of the hydraulic fluid, and the increased or decreased rotational speed of the engine or hydraulic pump, can be prevented by the present invention.

In a preferred embodiment of the invention, the time period required to eliminate the piston dead stroke of the frictional element $T_f$ is the parameter subjected to. In this case, the time period required to eliminate the piston dead stroke (dead-stroke-elimination time) can be established properly irrespective of the hydraulic fluid temperature and the rotational speed of the engine or hydraulic pump.

Alternatively, the control parameter is that control parameter which relates to a shift for changing the gearshift position of the automatic transmission from a neutral position to a drive position. In this case, an N-D shift or N-R shift can be carried out smoothly.

Alternatively, the control parameter is that control parameter which relates to a downshifting effected just before a vehicle stops running. This makes it possible to make a smooth downshifting at the time just before the vehicle stops running.

More preferably, the learning correction means performs a learning correction of the time period required to eliminate the piston dead stroke, based on a time period from the time point at which the piston dead stroke is eliminated to the time point at which actual gear-changing is started. In this case, the learning correction of the control parameter value is carried out such that the time period from the time point of the elimination of the dead-stroke to the time point of the start of the actual gear-changing becomes nearly constant. Therefore, even when the automatic transmission has an individual difference, the engagement of the frictional element can be prevented from starting too late or too early, and hence a smooth shifting can be realized.

More preferably, the speed change control apparatus further includes input speed detecting means for detecting an input rotational speed of the automatic transmission. The control apparatus judges that the time point of start of the actual gear-changing is reached, when a quantity of change of the input rotational speed, observed from the time point at which the piston dead stroke is eliminated, becomes greater than a predetermined value. In this case, the time point of the start of the actual gear-changing can be accurately recognized, so that the learning correction of the control parameter value can be more accurately carried out, whereby a smoother shifting can be realized.

In a preferred embodiment of the invention, the learning correction means performs the learning correction at least when the input rotational speed is in a low speed zone. In this case, a proper control parameter value can be established even when the input rotational speed is in the low speed zone of the engine or hydraulic pump where the hydraulic pump characteristic varies conspicuously. Although the hydraulic pump characteristics conspicuously differ in the low speed zone because of the presence of individual differences among automatic transmissions, this preferred embodiment of the present invention can positively prevent occurrences of shift shocks and degraded shift response, resulting from the individual differences among automatic transmissions. Moreover, gear-changing in a power-off state can be smoothly performed to prevent shift shocks from occurring.

Preferably, the learning correction means performs the learning correction in a case where the gearshift position of the automatic transmission is shifted from a neutral position to a drive position. In this case, an N-D shift or an N-R shift effected in a condition that a vehicle is stationary can be smoothly performed, thereby preventing a shift shock.

Preferably, the learning correction means performs the learning correction in a case where a downshifting is performed immediately before a vehicle stops running. In this case, the downshifting just before the vehicle stops running can be smoothly performed, to thereby prevent a shift shock. Preferably, the oil-pressure control means includes dead-stroke eliminating means for eliminating the piston dead stroke of the frictional element by supplying a full pressure to the frictional element, and oil-pressure supply means for supplying a predetermined oil pressure immediately after the piston dead stroke is eliminated. The control parameter is the predetermined oil pressure. In this case, the supplied oil pressure at the time of the start of the engagement of the frictional element can be established properly irrespective of the individual difference of the automatic transmission, the hydraulic fluid temperature, and the rotational speed of the engine or hydraulic pump. Accordingly, occurrences of a shift shock and degraded shift response, resulting from the individual difference of the automatic transmission, the increased or decreased temperature of the hydraulic fluid, and the increased or decreased speed of the engine or hydraulic pump, can be prevented.

BRIEF DESCRIPTION OF THE DRAWINGS

FIG. 13 is a diagram showing a basic-time map used in the N-D shift control;

FIG. 14 is a diagram showing a correction-time map used in the N-D shift control;

FIG. 15 is a diagram showing an initial-duty-ratio map used in the N-D shift control;

DETAILED DESCRIPTION OF THE PREFERRED EMBODIMENTS

Figure 1:
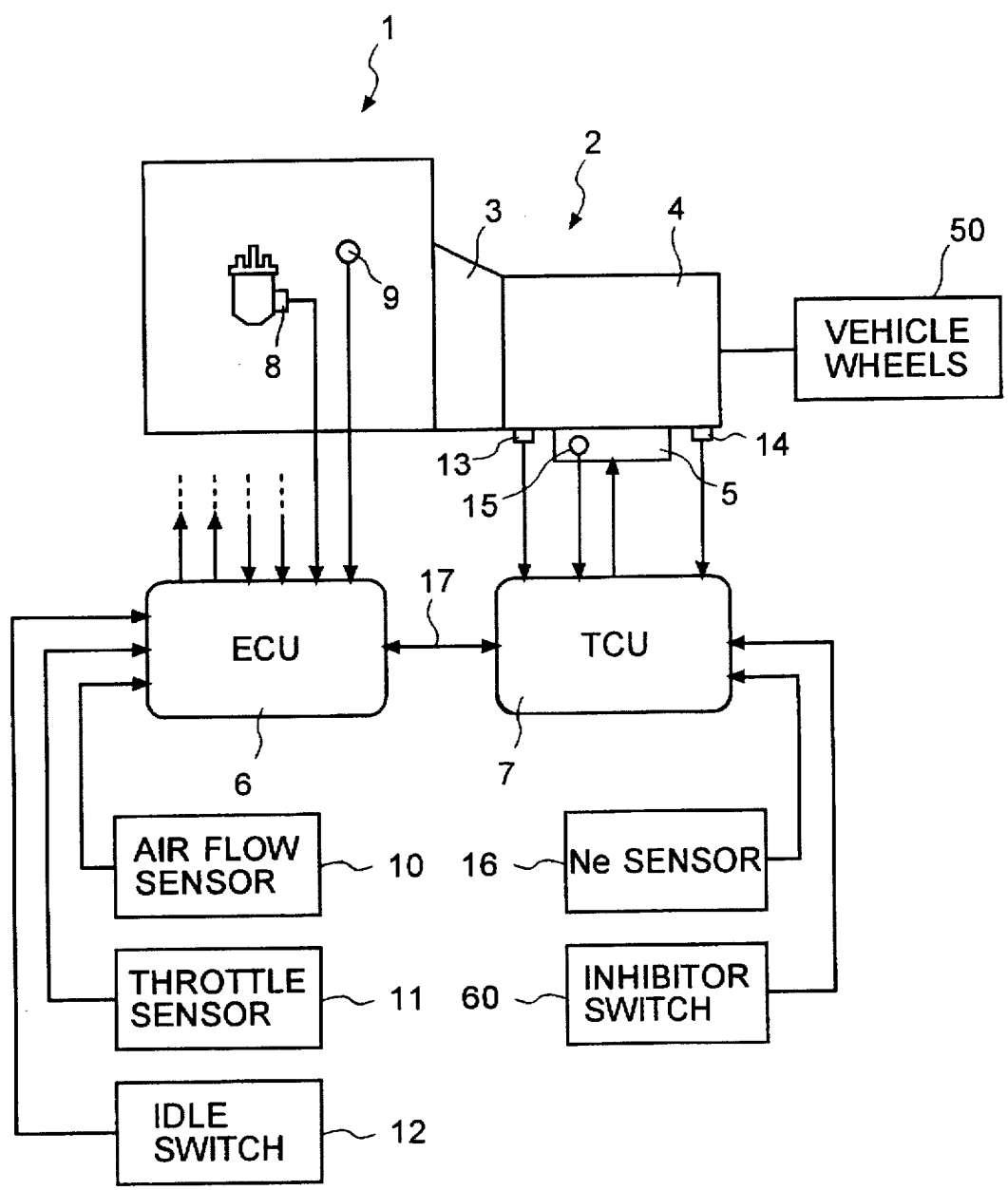
FIG. 1 is a block diagram showing a speed change control apparatus according to an embodiment of the present invention, together with a power train with which the apparatus is employed.

Referring to FIG. 1, there is schematically shown the construction of a power train of an automobile equipped with a speed change control apparatus according to the present invention. In FIG. 1, reference numeral 1 denotes an automotive gasoline engine (hereinafter simply referred to as "engine"). The output shaft of the engine 1 is connected to a four-speed automatic transmission 2 which in turn is connected to driving wheels 50 of a vehicle on which the engine 1 and the automatic transmission 2 are mounted.

The automatic transmission 2 is comprised of a torque converter 3, an auxiliary transmission 4, and a hydraulic controller 5. The auxiliary transmission 4 accommodates therein a plurality of planetary gear sets, and hydraulic friction-engaging elements such as hydraulic clutches and hydraulic brakes. A hydraulic circuit formed in the hydraulic controller 5 is provided with oil-pressure control electromagnetic valves.

Reference numeral 6 denotes an engine control unit (ECU) for controlling the operation of the engine 1, and reference numeral 7 denotes a transmission control unit (TCU) for controlling the operation of the automatic transmission 2. Each of the ECU 6 and the TCU 7 is provided with an input-output unit, memories (nonvolatile RAM, ROM, BURAM (back-up RAM), etc.), a central processing unit (CPU), timer counters, etc., which are not shown. The ECU 6 and the TCU 7 are connected by a signal cable 17 so that information can be exchanged therebetween with serial communication.

To the input side of the ECU 6 are connected a crank angle sensor 8 for detecting the engine rotational speed $N_e$ and a crank angle of each cylinder; a water-temperature sensor 9 for detecting the cooling-water temperature $T_W$; an air flow sensor 10 for detecting the intake air flow rate $Q_A$, a throttle sensor 11 for detecting the throttle valve opening degree $\theta_{TH}$; an idle switch 12 for detecting a fully closed state of the throttle valve; and various sensors and switches (not shown). To the input side of the TCU 7 are connected an $N_T$ sensor 13 for detecting the rotational speed $N_T$ of a turbine shaft of the torque converter 3 (rotational speed of an input shaft of the automatic transmission); an $N_O$ sensor 14 for detecting the rotational speed $N_O$ of a transfer drive gear instead of the vehicle speed V; an oil-temperature sensor 15 for detecting the temperature of hydraulic fluid (ATF); an $N_e$ sensor 16 for detecting the engine speed $N_e$ from ignition pulse; an inhibitor switch 60 for detecting the gearshift position established in the automatic transmission 2; and various sensors and switches (not shown).

The ECU 6 performs overall control of the engine 1, including fuel injection quantity control, ignition timing control, etc., based on various kinds of input information. The TCU 7 drives the hydraulic friction-engaging elements of the auxiliary transmission 4 through the hydraulic controller 5, based on the input information, and performs speed change control of the automatic transmission 2.

Figure 2:
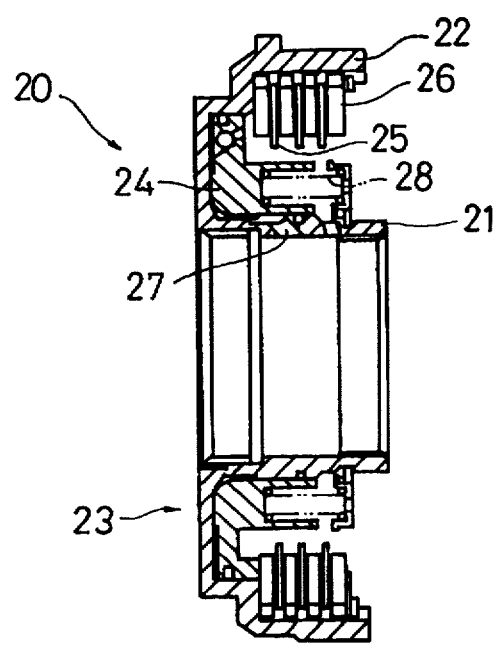
FIG. 2 is a vertical sectional view of a hydraulic clutch incorporated in the automatic speed change apparatus shown in FIG. 1.

FIG. 2 shows, in cross section, a hydraulic clutch 20 incorporated in the auxiliary transmission 4 as an engagement-side clutch for establishing a D-gearshift position (DRIVE). This hydraulic clutch 20 has a double-cylindrical blind clutch drum 23 which is comprised of an inner cylinder 21 and an outer cylinder 22. The clutch drum 23 accommodates therein a disc-like clutch piston 24, annular driving plates 25, and annular driven plates 26. These plates 25 and 26 are alternately disposed to be slidable in the axial direction of the clutch 20. The inner cylinder 21 of the clutch drum 23 is formed with a port 27. When pressurized hydraulic fluid is supplied through the port 27 to the clutch drum 23, the clutch piston 24 will be moved to the right in FIG. 2. This movement of the clutch piston 24 causes the driving and driven plates 25 and 26 to be pressed together. As a result, the clutch 20 is engaged to permit power transmission through the clutch 20. Clutch springs 28 are interposed between the inner cylinder 21 of the clutch drum 23 and the inner surface of the clutch piston 24. If the oil pressure of the hydraulic fluid is reduced, the clutch piston 24 will be urged by the clutch springs 28 to the left in FIG. 2, and the engagement of the clutch 20 will be released.

Figure 3:
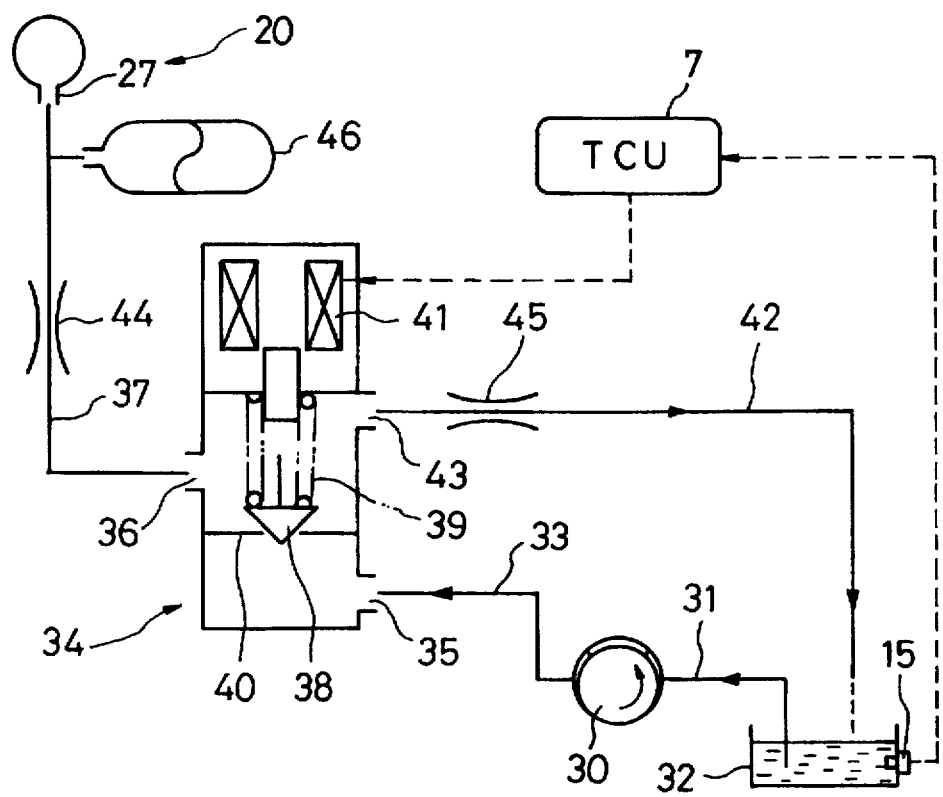
FIG. 3 is a block diagram of a hydraulic circuit for operating the hydraulic clutch shown in FIG. 2.

FIG. 3 shows a drive oil-pressure circuit of the hydraulic clutch 20. A hydraulic pump 30 is driven for rotation by the crank shaft of the engine 1, and pressurizes the hydraulic fluid drawn from an oil pan 32 through an oil passage 31 to generate an oil pressure. The hydraulic pump 30 is connected through an oil passage 33 to a first port 35 of an electromagnetic valve 34 which serves as an oil-pressure control valve. The discharge pressure of the hydraulic pump 30 is regulated with a relief valve (not shown) and the like provided in the oil passage 33 and then is supplied, as a line pressure, to the first port 35.

A valve body 38 of the electromagnetic valve 34, which is always urged toward a valve seat 40 by a return spring 39, is attracted and lifted by a solenoid 41 when this solenoid is energized by a drive current from the TCU 7. The electromagnetic valve 34 is duty-controlled with a predetermined frequency (for example, 50 Hz) by the TCU 7. If the valve body 38 is lifted, the first and second ports 35 and 36 will be communicated with each other and the line pressure will be supplied through the oil passage 37 to the hydraulic clutch 20 connected to the second port 36. If, on the other hand, the valve body 38 is seated on the valve seat 40, the line pressure supply will be stopped. Therefore, the oil pressure corresponding to the on-off duty ratio of the electromagnetic valve 34 is supplied from the hydraulic pump 30 through the electromagnetic valve 34 to the hydraulic clutch 20.

The electromagnetic valve 34 is provided with a drain port 43 which is always communicated to the second port 36. The drain port 43 is connected through an oil passage 42 to the oil pan 32. Meanwhile, orifices 44 and 45 are provided in the oil passages 37 and 42, respectively. The flow passage area of the orifice 44 on the oil passage 37 is designed to be larger than that of the orifice 45 on the oil passage 42. Furthermore, an accumulator 46 is provided between the hydraulic clutch 20 and the orifice 44 on the oil passage 37, whereby the line pressure that is supplied to the hydraulic clutch 20 is stabilized.

Dead-stroke elimination of the engagement-side hydraulic friction-engaging element and speed change control will be described taking for example a case where an N-D shift is carried out.

Figure 4:
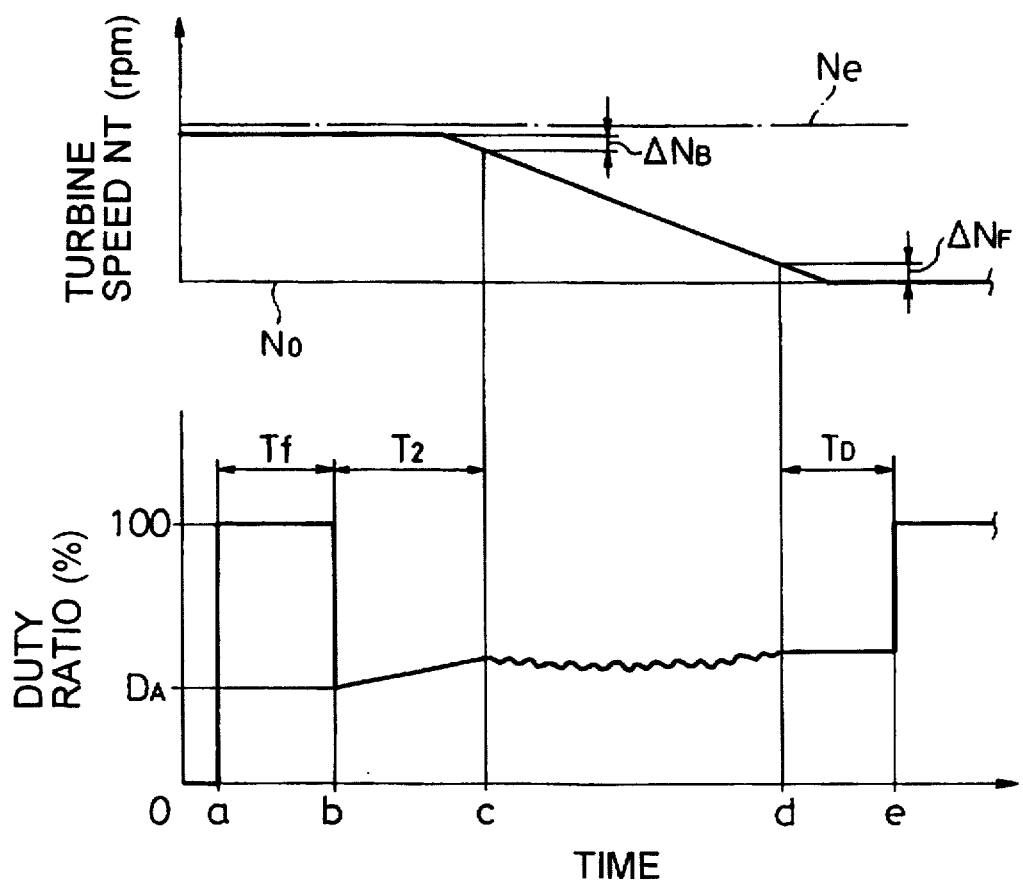
FIG. 4 is a graph showing changes in the turbine rotational speed and in the driving duty ratio of an electromagnetic valve with elapse of time, when the hydraulic clutch shown in FIG. 2 is engaged.

During the time period from the time a speed change command is output to the time the speed change is completed, the TCU 7 controls the drive of the electromagnetic valve 34 based on control programs to be described later. The control of the electromagnetic valve 34 consists of the following four steps. During the control of the electromagnetic valve 34, the driving duty ratio of the valve 34 varies with elapse of time, as shown in the graph of FIG. 4, and the turbine speed $N_T$ changes accordingly, with elapse of time, as shown in the graph of FIG. 4.

In the first step (from the time point "a" to the time point "b" in FIG. 4), the dead-stroke-elimination control of the clutch piston 24 is started immediately after the speed change command for shifting to DRIVE is output. Specifically, the electromagnetic valve 34 is fully opened with a driving duty ratio D of 100% over the period of time $T_f$ from a dead-stroke-elimination start time point (time point "a") to a dead-stroke-elimination end time point (time point "b"). Note that during the dead-stroke elimination period, the turbine speed $N_T$ (rpm) is constant and does not vary because the speed change has not been started yet.

In the second step (between the time point "b" and the time point "c"), the driving duty ratio D is first set to an initial engagement duty ratio $D_A$ and is increased from this value with a predetermined rate. If, during this period, torque transmission is started by the engagement of the hydraulic clutch 20, the turbine speed $N_T$ will begin to be reduced. At the time the turbine speed $N_T$ (rpm) is reduced to a predetermined speed (time point "c"), the speed change is assumed to have been started.

In the third step (between the time point "c" and the time point "d"), the driving duty ratio D is feedback-controlled so that the change rate of the turbine speed $N_T$ may reach a target turbine speed change rate. If the difference between the turbine speed $N_T$ and a gear-changing completion speed $N_O$ becomes less than or equal to a threshold value $\Delta N_F$ for gear-changing completion judgment (time point "d"), the third step will be ended and the following fourth step will be started.

In the fourth step (between the time point "d" and the time point "e"), the driving duty ratio D is maintained constant, and a stand-by time $T_D$ is allowed to pass. At the time the stand-by time $T_D$ is over (time point "e"), it is assumed that the turbine speed $N_T$ has completely matched with the gear-changing completion speed $N_O$. At the time point "e", the driving duty ratio D is again set to 100% and the N-D shift control is ended.

The procedures of the aforementioned control steps and a learning correction of the dead-stroke-elimination time $T_f$ will be described in detail referring to the flowcharts shown in FIGS. 5 to 12.

If a driver operates a select lever to move from NEUTRAL to DRIVE, the TCU 7 will detect a request for N-D shift, based on the output from the inhibitor switch 60. In this case, a shift command signal is output in the TCU 7 (at the time point "a" in FIG. 4), and the execution of N-D shift control subroutine shown in FIGS. 5 to 11 is started by the TCU 7. Once the N-D shift control is started, the N-D shift control subroutine will be repeatedly executed until the hydraulic clutch 20 is completely engaged.

Figure 5:
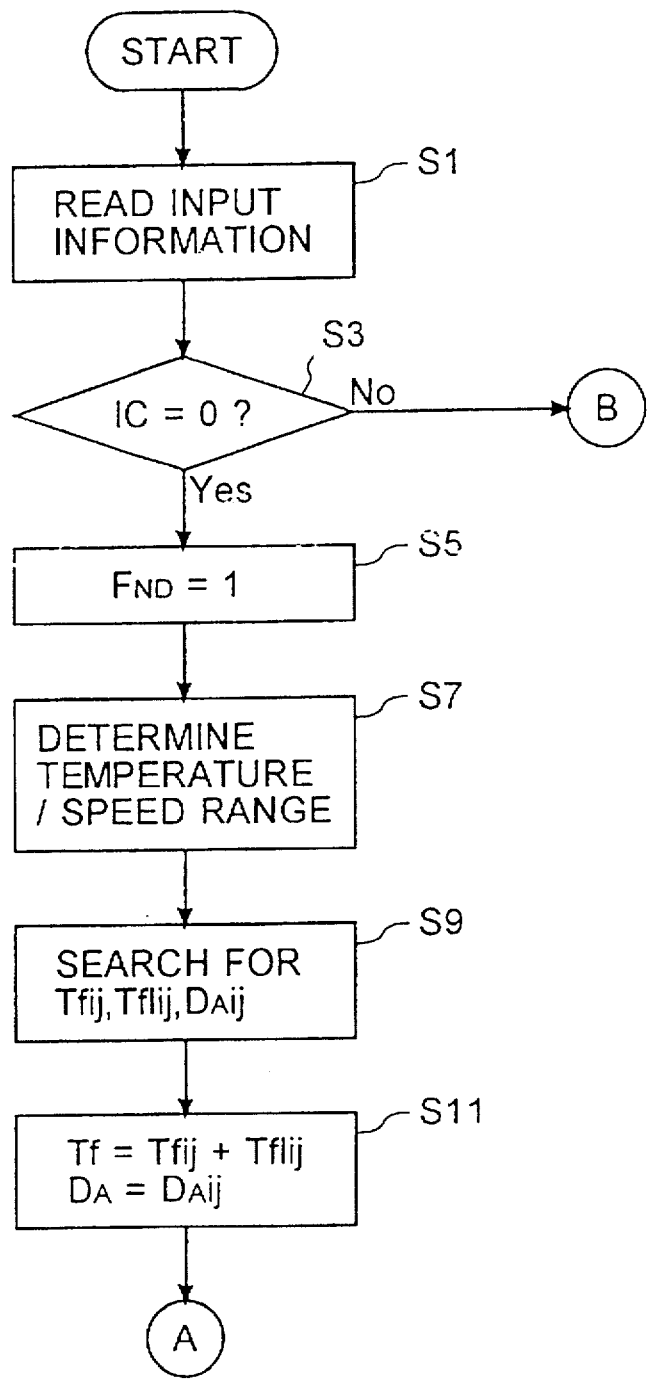
FIG. 5 is a flowchart showing part of an N-D shift control subroutine executed by the speed change control apparatus.

If the subroutine is started, at step S1 shown in FIG. 5, the aforementioned input information from various sensors and the ECU 6 will be written to the RAM by the TCU 7. Then, it is judged at step S3 whether a program control variable IC is equal to a value of "0" representing that the first step is executed for the first time. Immediately after the start of the N-D shift control, this program control variable IC is set to an initial value "0". Therefore, the judgment result at step S3 becomes "YES" and the control flow advances to step S5 in which the TCU 7 sets a flag $F_{ND}$ to a value "1" representing that the first step is being executed. If the value of the flag $F_{ND}$ is set to "1", the TCU 7 will recognize that the N-D shift control is being performed and the information "the first step of the N-D shift control is being performed" will be transmitted to the ECU 6.

At step S7, the TCU 7 determines the present fluid-temperature/rotational-speed range (hereinafter referred to as temperature/speed range) corresponding to the present hydraulic fluid temperature $T_{AFT}$ and to the present engine speed $N_e$, based on the input information from the oil-temperature sensor 15 and the $N_e$ sensor 16.

In this embodiment, the entire range of hydraulic fluid temperature $T_{ATF}$ is divided into five zones and the entire range of engine speed $N_e$ is divided into four zones, so that the entire temperature/speed zone is divided into twenty zones.

More specifically, the entire hydraulic-fluid-temperature range is divided into a first zone where the hydraulic fluid temperature $T_{ATF}$ is less than or equal to a first predetermined temperature $T_{A1}$ (30° C., for example), a second zone where $T_{ATF}$ is higher than $T_{A1}$ and less than or equal to a second predetermined temperature $T_{A2}$ (70° C., for example), a third zone where $T_{ATF}$ is higher than $T_{A2}$ and less than or equal to a third predetermined temperature $T_{A3}$ (80° C., for example), a fourth zone where $T_{ATF}$ is higher than $T_{A3}$ and less than or equal to a fourth predetermined temperature $T_{A4}$ (10° C., for example), and a fifth zone where $T_{ATF}$ is higher than $T_{A4}$. The entire engine-speed range is divided into a first zone where the engine speed $N_e$ is less than or equal to a first predetermined speed $N_1$ (650 rpm, for example), a second zone where $N_e$ is higher than $N_1$ and less than or equal to a second predetermined speed $N_2$ (750 rpm, for example), a third zone where $N_e$ is higher than $N_2$ and less than or equal to a third predetermined speed $N_3$ (850 rpm, for example), and a fourth zone where $N_e$ is higher than $N_3$.

If the present temperature/speed zone is determined, the TCU 7 will search, at step S9, for a basic dead-stroke-elimination time $T_{fij}$ and an initial duty ratio $D_{Aij}$ corresponding to the present temperature/speed zone, from a basic-time map and an initial-duty-ratio map prepared beforehand based on the experimental results and stored in the ROM of the TCU 7. The TCU 7 further searches for a learning-correction time $T_{flij}$ (parameter subjected to learning) corresponding to the present temperature/speed zone, from a correction-time map stored in the BURAM of the TCU 7. Here, subscript "i" (=1, 2, 3, 4, or 5) represents the i'th fluid temperature zone, while subscript "j" (=1, 2, 3, or 4) represents the j'th rotational speed zone.

As illustrated, by way of example, in FIGS. 13, 14, and 15, the basic dead-stroke-elimination time $T_{fij}$, the learning-correction time $T_{flij}$ the parameter subjected to learning, and the initial duty ratio $D_{Aij}$, which correspond to twenty temperature/speed zones respectively, are set up in the basic-time map, the correction-time map, and the initial-duty-ratio map, respectively.

Generally speaking, the value of basic dead-stroke-elimination time $T_{fij}$ to be set is the greater, the higher is the hydraulic fluid temperature $T_{ATF}$ or the lower is the engine speed $N_e$. Specifically, as shown typically by specific numerical values in FIG. 13, the basic dead-stroke-elimination time (for example, $T_{f51}$ (128 ms in this embodiment)) in that temperature/speed zone in which the hydraulic fluid temperature $T_{AFT}$ is high and the engine speed $N_e$ is low is greater than that (for example, $T_{f14}$ (64 ms in this embodiment)) in that temperature/speed zone in which the hydraulic fluid temperature $T_{AFT}$ is low and the engine speed $N_e$ is high. Note that the basic dead-stroke-elimination times may be the same even between different temperature/speed zones. For example, $F_{f21}$, $F_{f31}$, and $F_{f41}$ are set at the same value (112 ms in this embodiment).

As shown in FIG. 15, in the initial-duty-ratio map, the value of the initial duty ratio $D_{Aij}$, like in the case of the basic dead-stroke-elimination time $T_{fij}$ to be set is the greater, the higher is the hydraulic fluid temperature $T_{ATF}$ or the lower the engine speed $N_e$ is. In FIG. 15, exemplary numerical values of the initial duty ratio $D_{Aij}$ are parenthesized.

The learning-correction time $T_{flij}$ in the correction-time map is set by a learning correction to be described later. However, in the case of a new vehicle or immediately after a battery once removed from a vehicle is reinstalled, the learning-correction time $T_{flij}$ is reset to the initial value "0".

Next, at step S11, the TCU 7 obtains the dead-stroke-elimination time $T_f$ and the initial engagement duty ratio $D_A$ from the following equations, based on the basic dead-stroke-elimination time $T_{fij}$, the learning-correction time $T_{flij}$, and the initial duty ratio $AD_{fij}$ searched for at step S9.

$$T_f = T_{fij} + T_{flij}$$

$$D_A = D_{Aij}$$

Figure 6:
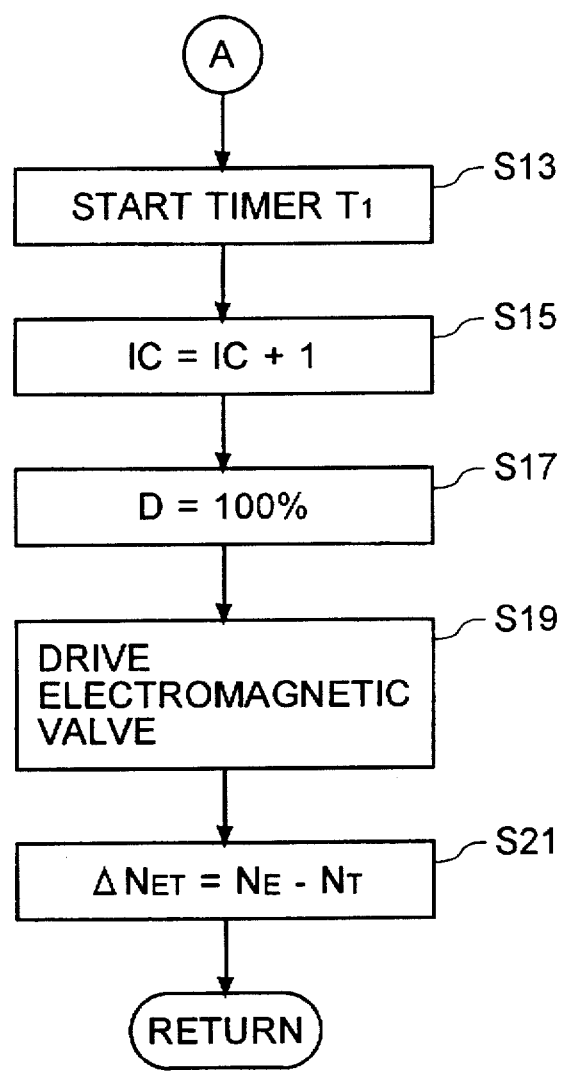
FIG. 6 is a flowchart showing another part, which follows FIG. 5, of the N-D shift control subroutine.
Figure 7:
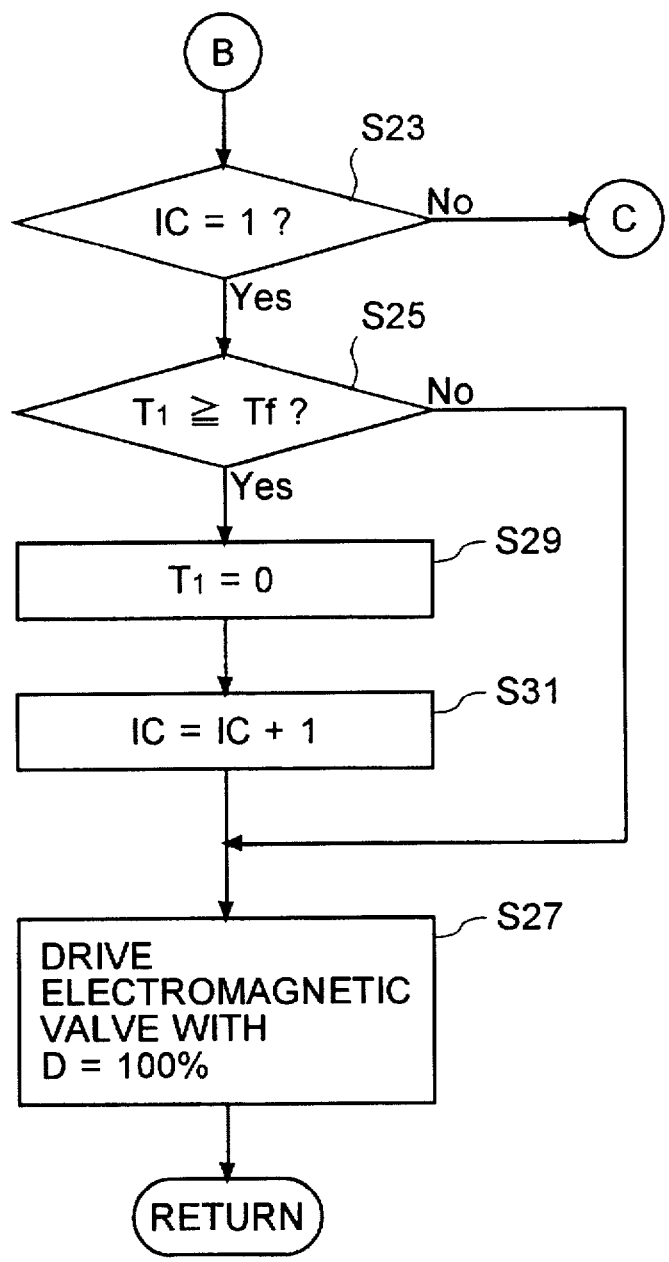
FIG. 7 is a flowchart showing still another part of the N-D shift control subroutine following FIG. 6.

At step S13 of FIG. 6, the TCU 7 causes a first timer to start to count a time $T_1$ elapsed from the start of the first step, and at step S15 a value "1" is added to the program control variable IC. Thus, the program control variable IC is updated from "0" to "1". Subsequently, at step S17, the TCU 7 sets the driving duty ratio D to 100%, and at step S19 the electromagnetic valve 34 is driven with this duty ratio D (100%). With this, the "dead-stroke elimination" for eliminating the piston dead stroke of the hydraulic clutch 20, which serves as the engagement-side frictional element in the N-D shift, is started. At step S21, a current initial difference $\Delta N_{ET}$ between the engine speed $N_e$ and the turbine speed $N_T$ is computed and stored in the RAM of the TCU 7. Whereupon, the N-D shift control in the present control cycle is completed, and the control flow returns to START.

If a predetermined control cycle elapses, the N-D shift control subroutine will be again executed from step S1. In the next control cycle, because the judgment result at step S3 subsequent to step S1 is "NO", the TCU 7 judges whether the program control variable IC is "1" or not (that is, whether or not the first step is in process), at step S23 of FIG. 7. Because the judgment result at step 23 is "YES", the TCU 7 judges, at step S25, whether the time $T_1$ counted by the first timer is greater than the dead-stroke-elimination time $T_P$, that is, whether the first step has been ended. If the judgment result at step S25 is "NO", the control flow will advance to step S27 in which the electromagnetic valve 34 is driven with the driving duty ratio D of 100%. Thus, the dead-stroke elimination of the hydraulic clutch 20 continues, and the control flow returns to START.

Thereafter, a sequence of steps S1, S3, S23, S25, and S27 will be repeatedly executed, so long as the judgment result at step S25 is "NO". If the judgment result at step S25 is "YES", the time $T_1$ counted by the first timer will be reset to "0" at step S29. At step S31, a value "1" is added to the program control variable IC, and consequently, the variable IC is updated from "1" to "2". Then, the control flow returns to START.

Figure 8:
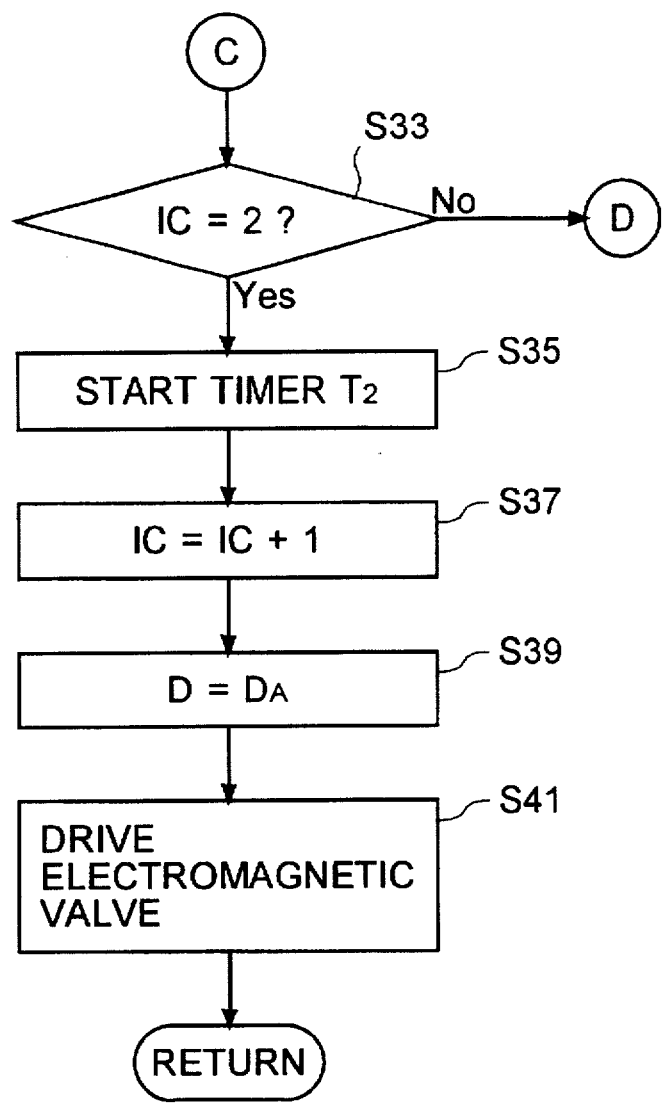
FIG. 8 is a flowchart showing still another part of the N-D shift control subroutine following FIG. 7.

If the value of the program control variable IC is updated to "2", the judgment result at step S23 will be "NO" and the control flow will advance to step S33 of FIG. 8. At step S33 it is judged whether the value of the program control variable IC is "2", that is, whether it is a first run in the second step. Since the judgment result at step S33 is "YES", the TCU 7 causes a second timer to start, at step S35, to count the time $T_2$ that has elapsed from the start of the second step, and a value "1" is added to the program control variable IC, at step S37, to update the control variable IC from "2" to "3". At step S39, the TCU 7 sets the driving duty ratio D to the initial engagement duty ratio $D_A$, and at step S41 the electromagnetic valve 34 is driven with the duty ratio $D_A$. The control flow returns to START.

Figure 9:
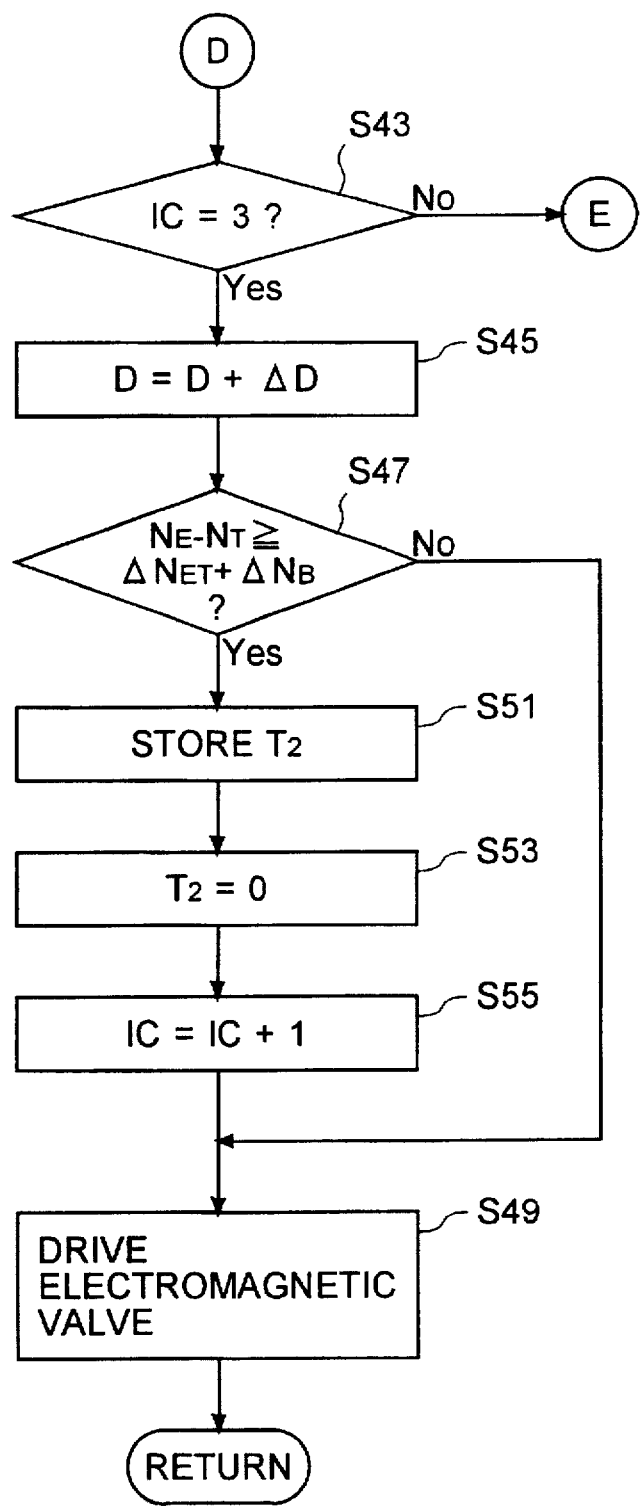
FIG. 9 is a flowchart showing another part of the N-D shift control subroutine following FIG. 8.

If the value of the program control variable IC is updated to "3", the judgment result at step S33 will be "NO," and the control flow will advance to step S43 of FIG. 9. At step S43, it is judged whether the value of the program control variable IC is "3", that is, whether the second step is in process. Since the judgment result at step S43 is "YES", the TCU 7 adds a predetermined increment quantity $\Delta D$ to the driving duty ratio D, at step S45. At step S47 it is judged whether the difference between the engine speed $N_e$ and the turbine speed $N_T$ is greater than the sum of the initial difference $\Delta N_{ET}$ and a predetermined engagement-start judging threshold value $\Delta N_B$ (in this embodiment 50 rpm), i.e., whether actual gear-changing is started. If the judgment result at step S47 is "NO", the control flow will advance to step S49. At step S49, the electromagnetic valve 34 is driven with the driving duty ratio D which has been set at step S45. With this, the piston stroke in the direction of clutch engagement is encouraged in the hydraulic clutch 20.

If the hydraulic clutch 20 starts to engage, i.e., the actual gear-changing is started, the judgment at step S47 will be "YES". In this case, at step S51 the TCU 7 stores the count value $T_2$ of the second timer at the start of the actual gear-changing (time period from the second step start time to the actual gear-change start time). The stored value $T_2$ will be used in the below-mentioned subroutine for learning-correction of the dead-stroke-elimination time. At step 53, the TCU 7 resets the count value $T_2$ of the second timer to "0", and at step S55 a value "1" is added to the program control variable IC to update the control variable IC from "3" to "4". The control flow is returned to START.

Figure 10:
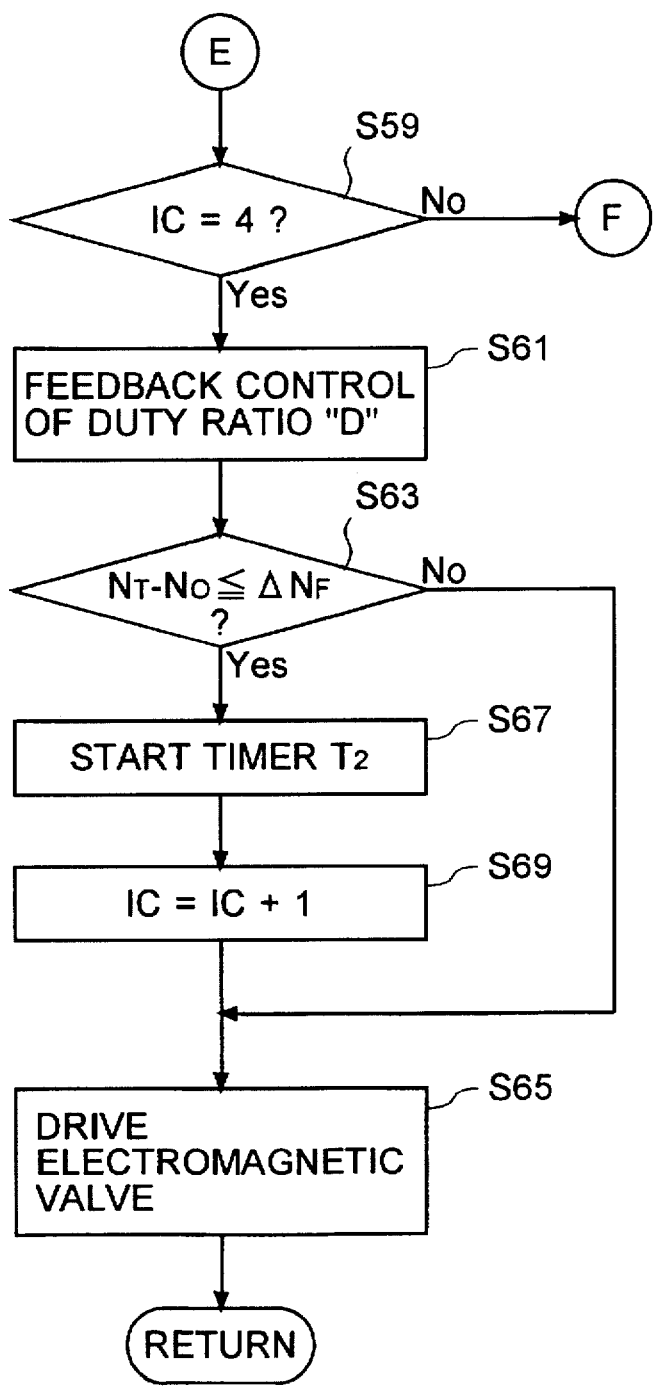
FIG. 10 is a flowchart showing still another part of the N-D shift control subroutine following FIG. 9.
Figure 11:
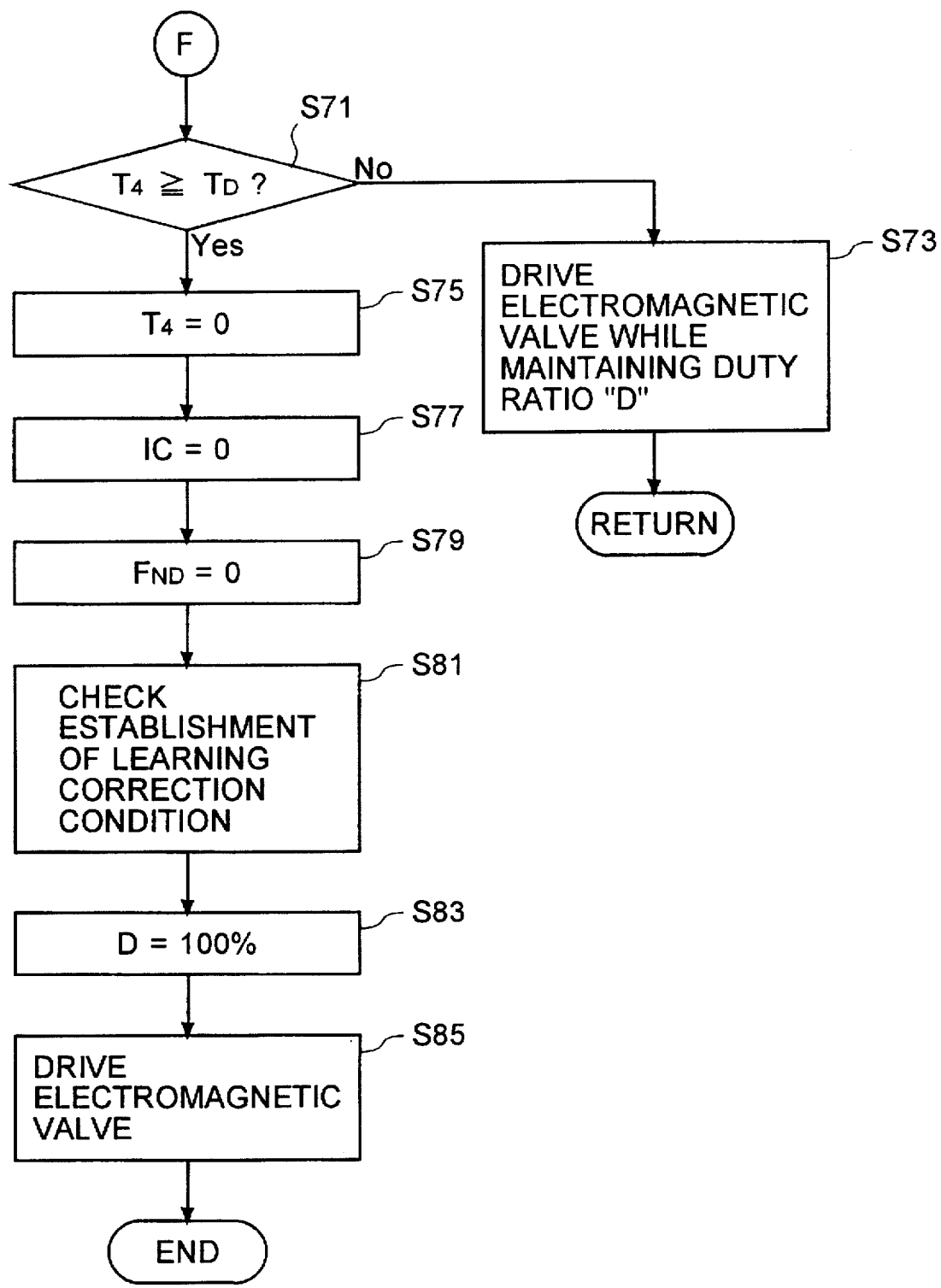
FIG. 11 is a flowchart showing still another part of the N-D shift control subroutine following FIG. 10.

If the value of the program control variable IC is updated to "4", the judgment result at step S43 will be "NO" and the control flow will advance to step S59 of FIG. 10. At step S59 it is judged whether the value of the program control variable IC is "4", that is, whether the third step is in process. Since the judgment result at step S59 is "YES", the TCU 7 increases or decreases the driving duty ratio D by feedback control, at step S61, so that the change rate $\Delta N_T$ of the turbine speed $N_T$ may be a predetermined target turbine speed change rate $\Delta N_{TO}$. At step S63, the TCU 7 judges whether the difference between the turbine speed $N_T$ and the gear-changing completion speed $N_O$ is equal to or less than a threshold value $\Delta N_F$ (in this embodiment 150 rpm) for judgment of gear-changing completion. If the judgment result at step S63 is "NO", the control flow will advance to step S65 in which the electromagnetic valve 34 is driven with the driving duty ratio D obtained at step S61. The control flow returns to START.

A sequence of steps S1, S3, S23, S33, S43, S59, S61, S63, and S65 will be repeatedly executed, so long as the difference $(N_T-N_O)$ is greater than the threshold value $\Delta N_F$.

Thereafter, if the difference $(N_T-N_O)$ becomes less than or equal to the threshold value $\Delta N_F$ and the judgment result at step S63 becomes "YES", the control flow will advance to step S67 in which the TCU 7 causes a fourth timer to start to count a time period $T_4$ that has elapsed from the start of the fourth step. At step S69, a value "1" is added to the program control variable IC to update the control variable IC from "4" to "5". Furthermore, at step S65, the electromagnetic valve 34 is driven with the driving duty ratio D obtained at step S61. The control flow returns to START.

If the value of the program control variable IC is updated to "5", the judgment result at step S59 will be "NO". The control flow will then advance to step S71 of FIG. 11. At step S71, it is judged whether the count value $T_4$ is greater than or equal to a predetermined stand-by time TD (in this embodiment 0.2 sec). If the judgment result at step S71 is "NO", the control flow will advance to step S73 in which the driving duty ratio D, obtained at step S61 immediately before the start of the fourth step, is maintained, and the electromagnetic valve 34 is driven with the driving duty ratio D.

A sequence of steps S1, S3, S23, S33, S43, S59, S71 and S73 will be repeatedly executed, so long as the stand-by time $T_D$ has not elapsed from the start of the fourth step.

Thereafter, if the stand-by time $T_D$ has elapsed and the judgment result at step S71 becomes "YES", then the count value $T_4$ of the fourth timer, the program control variable IC, and the flag FND will be reset to "0" at steps S75, S77, and S79, respectively. Then, at step S81, the TCU 71 confirms that a condition for execution of the learning correction of the dead-stroke-elimination time is satisfied. The learning correction condition in this embodiment includes five requirements: (i) the vehicle speed V is 0 km/h (the vehicle is stationary), (ii) the throttle valve opening degree is less than or equal to 5%, (iii) the engine speed $N_e$ is less than or equal to 1200 rpm, (iv) the hydraulic fluid temperature is within a range of −7° C. to 120° C., and (v) the idle switch 12 is on.

At step S83, the TCU 7 sets the driving duty ratio D to 100%, and at step S85, the electromagnetic valve 34 is driven with this duty ratio D (=100%). Thus, the N-D shift control subroutine is ended.

At the time the N-D shift control subroutine is completed, the TCU 7 starts execution of the learning correction subroutine for the dead-stroke-elimination time.

Figure 12:
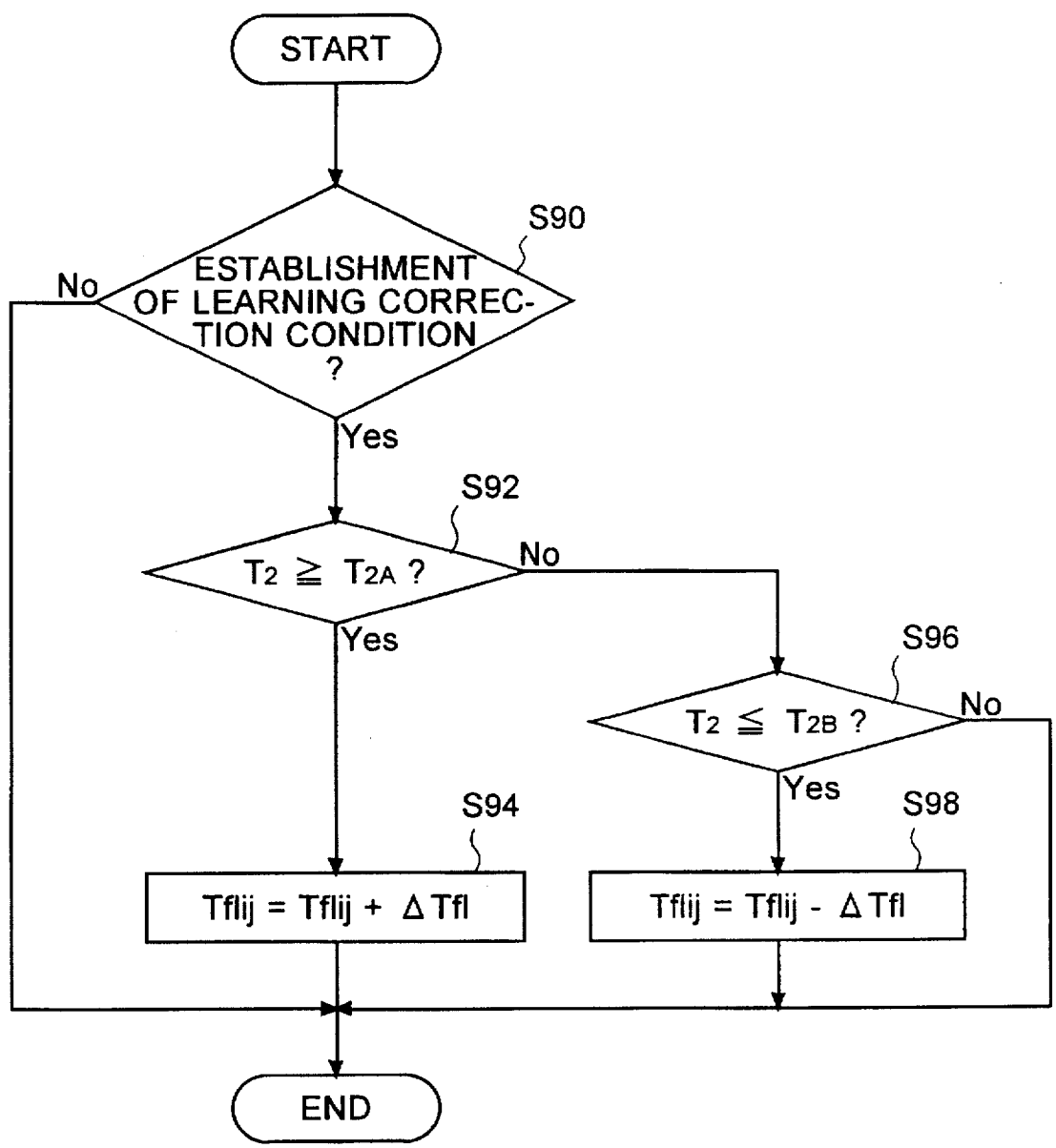
FIG. 12 is a flowchart showing a dead-stroke-elimination-time learning correction subroutine executed by the speed change control apparatus.
Figure 16:
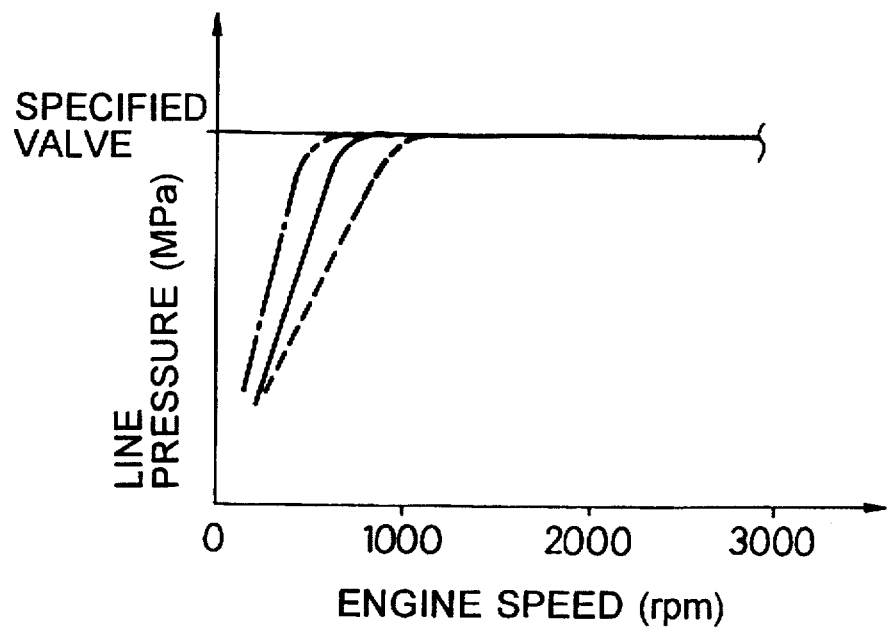
FIG. 16 is a graph showing engine speed versus line pressure characteristics of hydraulic pumps for automatic transmissions, and variations in hydraulic pump characteristic caused by the individual differences among automatic transmissions.
Figure 17:
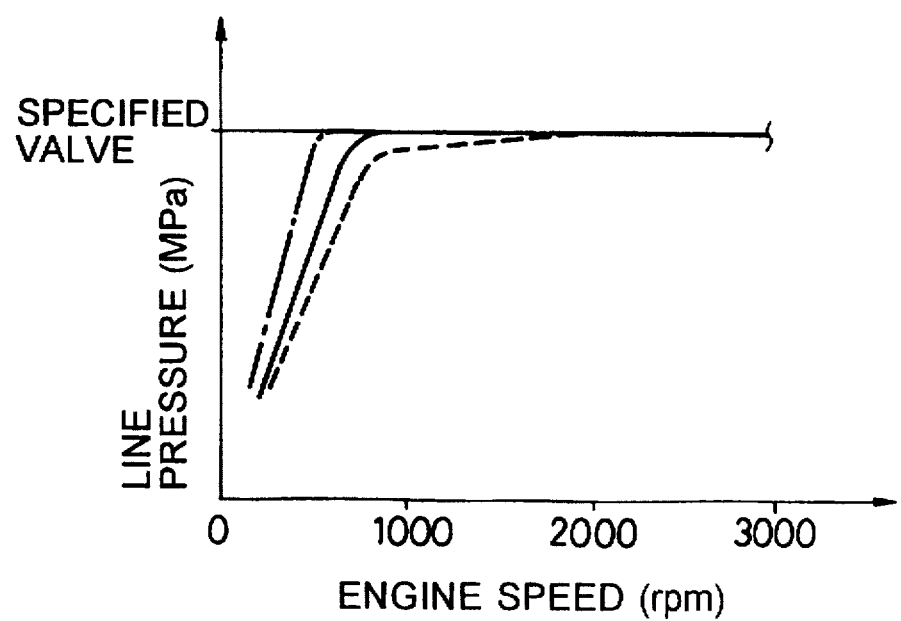
FIG. 17 is a graph showing how the hydraulic pump characteristic varies depending upon the hydraulic fluid temperature.

In this subroutine, the TCU 7 first judges, at step S90 of FIG. 12, whether the learning correction condition has been established, based on the confirmation result of the learning correction condition at step 81 of the N-D shift control subroutine. If the judgment result at step S90 is "NO", the learning correction subroutine for the dead-stroke-elimination time will be immediately ended, so that the learning correction for the dead-stroke-elimination time in the N-D shift control is inhibited.

Meanwhile, if the judgment result at step S90 is "YES", the TCU 7 will judge, at step S92, whether the count value $T_2$ of the second timer stored at step S51 of the N-D shift control subroutine is greater than a predetermined upper-limit threshold value $T_{2A}$ (in this embodiment 320 ms). If the judgment result at step S92 is "YES", the control flow will advance to step S94 in which a predetermined correction gain $\Delta T_{fl}$ (in this embodiment 16 ms) is added to the learning-correction time $T_{flij}$ for the current fluid-temperature/rotational-speed zone (as described above, the initial value is "0"), whereby the learning correction of the dead-stroke-elimination time in relation to the N-D shift control is completed, and the learning correction subroutine is ended.

If the judgment result at step S92 is "NO", the TCU 7 will judge whether the count value $T_2$ of the second timer is less than or equal to a predetermined lower-limit threshold value $T_{2B}$ (in this embodiment 288 ms), at step S96. If the judgment result at step S92 is "YES", the control flow will advance to step S98 where the correction gain $\Delta T_{fl}$ is subtracted from the learning-correction time $T_{flij}$. With this, the learning correction of the dead-stroke-elimination time in relation to the N-D shift control is completed, and the learning correction subroutine is ended.

If, on the other hand, the judgment result at step S96 is "NO", it will be judged that the dead-stroke-elimination time is proper, and the learning correction subroutine will be ended. In this case, the learning-correction time $T_{flij}$ is not updated.

As has been described, when a time period required to execute the second step of the N-D shift control (hereinafter referred to as second step time) T2 is too long, the learning-correction time $T_{flij}$ used in the computation of the dead-stroke-elimination time at step S11 of the N-D shift control subroutine is extended. Meanwhile, when the second step time T2 is too short, the learning-correction time $T_{flij}$ is shortened. That is, the learning correction of the learning-correction time $T_{flij}$ and accordingly the learning correction of the dead-stroke-elimination time $T_f$ are performed.

Each time the N-D shift control is performed, learning correction is likewise carried out. If such learning correction is repeatedly made, the second step time $T_2$ relating to each of the temperature/speed zones will be converged into a proper range defined by the upper-limit threshold value $T_{2A}$ and the lower-limit threshold value $T_{2B}$. As a result, the time period required to execute the N-D shift is properly established irrespective of the difference in the engine operating states and the individual differences among the auxiliary transmissions 4 or the like. Consequently, degraded shift response and shift shocks are entirely prevented. Particularly, in the low speed zone where the engine is in its power-off state, the dead-stroke elimination is sufficiently carried out, and a shift feeling is considerably improved.

Note that the reason why the learning of the dead-stroke-elimination time $T_f$ in the present embodiment is performed based on the value of the second step time $T_2$ is that the length of the dead-stroke-elimination time $T_f$ is reflected directly on the second step time $T_2$. A substantial dead-stroke time observed in the hydraulic clutch 20 is equal to a time period from the time a shift command is generated (start of dead-stroke elimination) to the time actual gear-changing starts (between the time point "a" and the time point "c" in FIG. 4). Therefore, if the dead-stroke-elimination time $T_f$ is short, the second step time $T_2$ will become longer, and conversely, if the dead-stroke-elimination time $T_f$ is long, the second step time $T_2$ will become shorter. The learning correction of the dead-stroke-elimination time $T_f$ can be carried out based on a time period from the start to the end of the actual gear-changing (between the time point "c" and the time point "d" in FIG. 4). In this case, however, the gear-changing time is fluctuated by feedback control. Thus, a more accurate correction can be made based on results of the learning of the second step time $T_2$ in which an open loop control is carried out.

While description of the typical embodiment of the present invention is now ended, the present invention is not limited to the aforementioned embodiment.

For example, although the aforementioned embodiment has been applied to the learning correction of the dead-stroke-elimination time in the N-D shift, the present invention may also be applied to N-R shift, cost-down shifting (power-off downshifting), power-off upshifting, etc. Furthermore, the learning correction according to the present invention may be made when a downshifting is performed just before a vehicle stops running.

Briefly describing the learning correction of the dead-stroke-elimination time in an N-R shift, a request for N-R shift is discriminated based on the output from the inhibitor switch 60, like in the case of the N-D shift. The oil pressure supply to the hydraulic clutch or hydraulic brake, which is an engagement-side frictional element in the N-R shift, is controlled, as in the case of the N-D shift, and the learning correction of the dead-stroke-elimination time is made in the same way.

Stating as to the learning correction of the dead-stroke-elimination time in a power-off downshifting and a power-off upshifting, during driving of a vehicle with the shift lever held in DRIVE, the TCU 7 decides an optimum gearshift position in accordance with, for example, the vehicle speed and the throttle valve opening degree while referring to a shift map, in a conventional manner, and sends a downshifting command or an upshifting command as needed. Furthermore, if the throttle valve opening degree detected by the throttle sensor 11 represents a throttle full-closed state, the TCU 7 will judge that the engine is in the power-off state. Then, if a request for power-off downshifting or a request for power-off upshifting is discriminated, the TCU 7 will perform power-off downshifting control or power-off upshifting control in a conventional manner, and then the learning correction of the dead-stroke-elimination time will be made in the same manner as in the case of N-D shift.

Briefly stating as to the learning correction of the dead-stroke-elimination time in a downshifting which is made immediately before a vehicle stops running, the TCU 7 discriminates that the vehicle is about to be stopped, based on the output of the $N_O$ sensor representative of the vehicle speed, and a request for downshifting is discriminated as described above. If the downshifting request is sent immediately before the vehicle stops, a conventional downshifting control will be performed and then, like in the case of the N-D shift, the learning correction of the dead-stroke-elimination time will be made.

In addition, while the learning-correction time and accordingly the dead-stroke-elimination time have been learned in the aforementioned embodiment, the learning of the initial-engagement duty ratio may be performed based on a time period required to execute the second step.

Furthermore, various discrimination threshold values, set values, and typical control procedures may be changed and modified suitably without departing from the scope of the invention.

Moreover, while the aforementioned embodiment uses an electromagnetic valve driven with a duty ratio, there may be used a so-called linear solenoid valve which is controlled by a current value.

What is claimed is:

1. A speed change control apparatus for an automatic transmission interposed between an internal combustion engine and a driving wheel, comprising:

a frictional element which is engaged to establish a predetermined gearshift position when hydraulic fluid is supplied thereto, a hydraulic pump for generating the pressure of the hydraulic fluid, oil-temperature detecting means for detecting a temperature of hydraulic fluid in the automatic transmission, speed detecting means for detecting a rotational speed of the internal combustion engine or the hydraulic pump, control time period setting means for setting a control time period required to eliminate a piston dead stroke of the frictional element, based on the temperature of the hydraulic fluid detected by said oil-temperature detecting means and the rotational speed detected by said speed detecting means, oil-pressure control means for adjusting the oil pressure supplied from the hydraulic pump to the frictional element to establish the predetermined gearshift position and for performing a piston dead stroke control to eliminate the piston dead stroke based on the control time period ($T_p$) when gear-changing is carried out to establish the predetermined gearshift position, and learning correction means for effecting, based on a time period elapsed from a time point at which the piston dead stroke control is completed to a time point at which actual gear-changing is started, learning of a correction time period ($T_1$) for an associated one of a plurality of pre-determined learning areas based on the temperature of the hydraulic fluid and the rotational speed, the correction time period being used to correct the control time period ($T_p$);

wherein the oil-pressure control means performs the piston dead stroke control based on the control time period ($T_p$) corrected by said learning correction means.

2. The speed change control apparatus according to claim 1, further including:

input speed detecting means for detecting an input rotational speed of the automatic transmission;

wherein said learning correction means judges that the time point of start of the actual gear-changing is reached, when a quantity of change in the input speed observed from the time point at which the piston dead stroke control is completed, becomes greater than a predetermined value.

3. The speed change control apparatus according to claim 1, wherein said learning correction means performs the learning at least when the rotational speed is in a low speed zone in which the pressure supplied from the hydraulic pump is small.

4. The speed change control apparatus according to claim 1, wherein said learning correction means performs the learning at a time of gear-changing for changing a gearshift position of the automatic transmission from a neutral position to a drive position.

5. The speed change control apparatus according to claim 1, wherein said learning correction means performs the learning in a case where a downshifting is performed immediately before a vehicle stops running.

6. The speed change control apparatus according to claim 3, wherein said rotational speed is a rotational speed observed when the internal combustion engine is in an idling state.

7. The speed change control apparatus according to claim 1, wherein said oil-pressure control means supplied a full pressure until the piston dead stroke control is completed, and makes a changeover to a predetermined oil pressure immediately after the piston dead stroke control is completed.

8. The speed change control apparatus according to claim 7, wherein said predetermined oil pressure is set based on the temperature of the hydraulic fluid and the rotational speed.

* * * * *